United States Patent [19]

Engelstad

[11] Patent Number: 5,163,874
[45] Date of Patent: Nov. 17, 1992

[54] DOUBLE ROLLER CHAIN COUPLER WITH SHIELD

[75] Inventor: Jonathan L. Engelstad, Ankeny, Iowa

[73] Assignee: Deere & Company, Moline, Ill.

[21] Appl. No.: 256,353

[22] Filed: Oct. 11, 1988

[51] Int. Cl.$^5$ .............................................. F16D 3/54
[52] U.S. Cl. ........................................ 464/49; 403/344; 464/170
[58] Field of Search ............... 74/608, 609; 403/344; 464/49, 170, 173, 903

[56] References Cited

U.S. PATENT DOCUMENTS

| | | | |
|---|---|---|---|
| 1,303,853 | 5/1919 | Clark | 464/49 |
| 1,943,791 | 1/1934 | Gallamore | 464/49 X |
| 2,045,565 | 6/1936 | Belcher | 464/49 |
| 2,587,365 | 2/1952 | Mize | 464/49 |
| 2,792,695 | 5/1957 | Copping | 464/49 X |
| 3,362,191 | 1/1968 | Louette | 464/49 |
| 3,385,080 | 5/1968 | Sorenson | 464/49 |
| 3,503,225 | 3/1970 | Shindelar et al. | 464/170 X |
| 3,520,151 | 7/1970 | Resener | 464/49 |
| 4,166,708 | 9/1979 | Lafferty, Sr. | 403/344 X |
| 4,395,245 | 7/1983 | Carlson | 464/49 |

FOREIGN PATENT DOCUMENTS

| | | | |
|---|---|---|---|
| 709862 | 1/1980 | U.S.S.R. | 464/49 |
| 1270435 | 11/1986 | U.S.S.R. | 464/49 |
| 349788 | 6/1931 | United Kingdom | 464/49 |

OTHER PUBLICATIONS

Browning Manufacturing Division brochure, "Browning power transmission equipment", pp. 506 and 507, 1975.

Primary Examiner—Daniel P. Stodola

[57] ABSTRACT

A link chain coupler including a pair of sprockets coupled by a double row chain, and a steel ring axially positionable over the chain to hold the chain in the sprocket teeth while torque is transmitted through the connection. A two-piece coupler shield is assembled over the steel ring to hold the ring in position, to act as a shield and to protect the coupler from the environment.

11 Claims, 2 Drawing Sheets

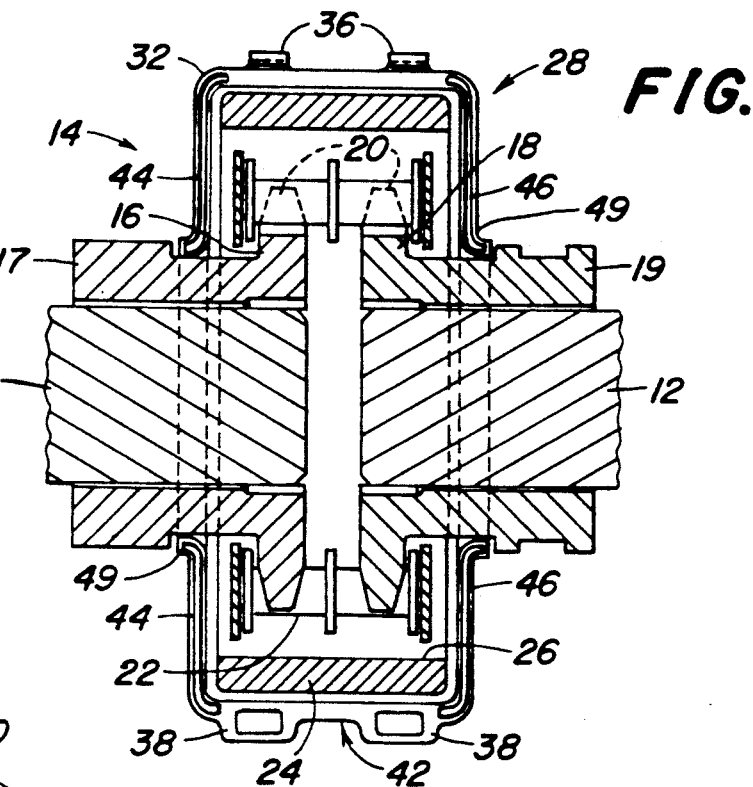
FIG. 2
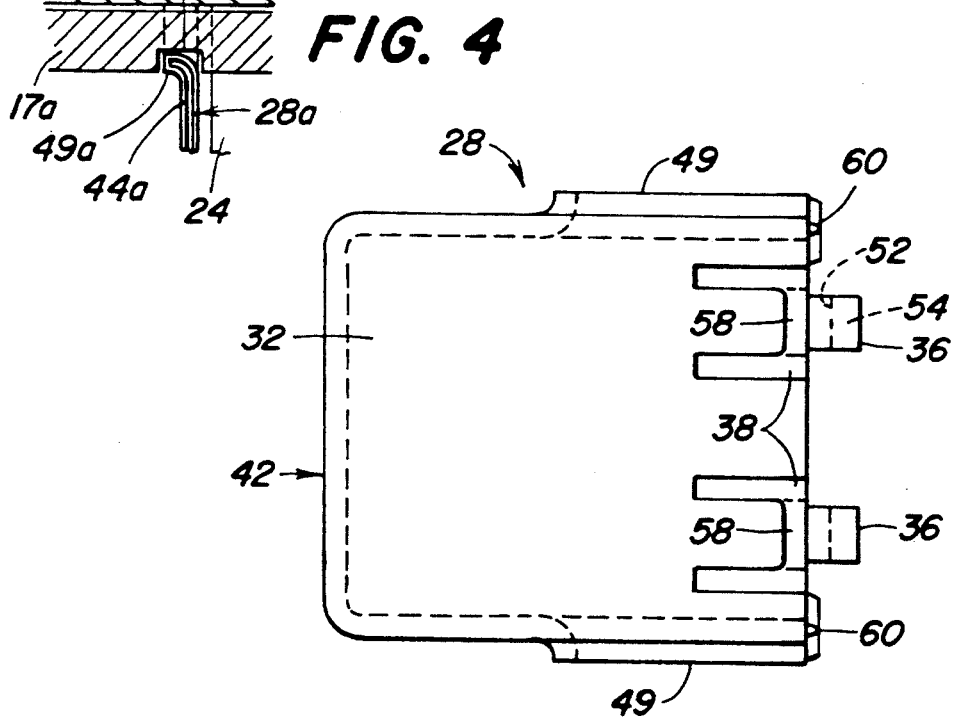
FIG. 4
FIG. 3

DOUBLE ROLLER CHAIN COUPLER WITH SHIELD

BACKGROUND OF THE INVENTION

The present invention relates generally to drive couplings, and more specifically to a double roller chain connector having a retainer and coupler shield.

Couplers utilizing a pair of sprockets placed end to end and connected by a double roller chain extending over the sprocket teeth are frequently utilized to connect two drive shafts. The double link chain and double sprocket arrangement permit some axial misalignment of the shafts while retaining direct drive of one shaft from the other. With some arrangements, a coupler joint is provided on the double link chain and a straight pin is utilized to connect end links after the chain is wrapped around the two sprockets. With some couplers rubber boots are stretched over the joint for protection from the environment. To cover the rotating shafts, long sheet metal shields often are required. Connecting the chain link around the sprockets can be a tedious and time-consuming job. Other types of chain connectors wherein the chain is supported over the sprockets by a cylindrical member can be expensive to manufacture and difficult to assemble. Providing adequate shielding for protecting the connection from the environment and for protecting the operator from the rotating connection has been a continuing problem because of the difficulty in assembling the joint or in providing a compact and economical shield.

It is therefore an object of the present invention to provide an improved chain coupler for connecting two shafts or the like. It is a further object to provide such a coupler which is relatively easy to assemble, relatively inexpensive and protects the connection from the environment. It is a further object to provide such a device having an improved shield.

It is still a further object of the present invention to provide an improved coupler for a pair of shafts or the like which may be connected quickly and easily and which provides improved shielding characteristics as compared with previously available couplers. It is yet another object to provide such a device which is relatively inexpensive to manufacture and easy to use.

A coupler constructed in accordance with the teachings of the present invention includes a drive sprocket and a driven sprocket placed end to end and wrapped with a double row chain to transmit drive from one sprocket to the other. The end links of the chain remain unconnected and a steel ring, sized to slide over the sprockets with the chain attached, holds the chain in the sprocket teeth while torque is transmitted through the joint. A coupler shield having a pair of identical halves which snap together are joined over the sprockets, chain and steel ring to maintain the steel ring over the sprockets. The shield can also spin freely with respect to the joint to provide protection for the operator. The shield halves, which are preferably fabricated from plastic with integral mating snap structures, are relatively light in weight and inexpensive to manufacture and provide good protection of the connector from the environment. In one embodiment of the invention, grooves on the sprocket hubs receive the ends of the shields for better sealing and axial stability. The structure provides a considerable advantage in time savings for assembly and disassembly of the connection.

These and other objects, features and advantages of the present invention will become apparent to those skilled in the art from the description which follows and from the drawings.

BRIEF DESCRIPTION OF THE DRAWINGS

FIG. 2 is a cross-sectional view of the coupler taken generally along lines 2—2 of FIG. 1.

FIG. 3 is a view of a shield half, taken essentially along lines 3—3 of FIG. 1.

FIG. 4 is an enlarged view of a portion of the coupler adjacent the sprocket hub and showing a modified form of the invention.

DESCRIPTION OF THE PREFERRED EMBODIMENT

Figure 1:
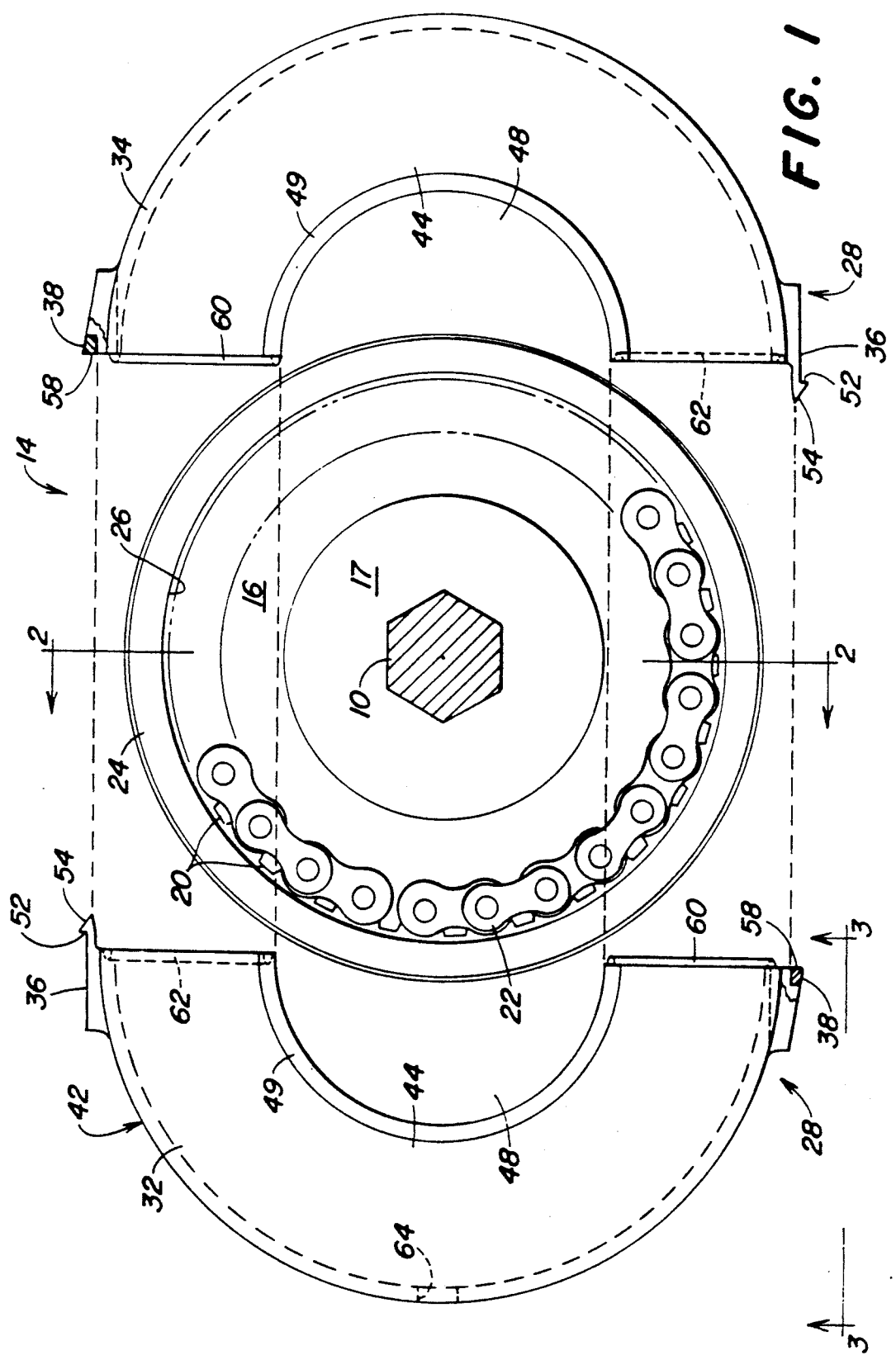
FIG. 1 is an end view of the coupler of the present invention, partially disassembled to better show the components.

Referring to the Figures, there is shown an input shaft designated generally at 10 and an output shaft or similar device 12 connected by a chain coupler indicated generally at 14. The chain coupler 14 includes first and second sprockets 16 and 18 with hubs 17 and 19, respectively, fixed to the input and output shafts 10 and 12. The sprockets 16 and 18 have identical gear teeth 20 supported in close proximity by the corresponding shafts. A double row chain 22 is wrapped around the first and second sprockets 16 and 18 to connect the two sprockets for rotation together. A steel ring 24 having an open-ended inner bore 26 with a diameter approximately equal to but slightly larger than the diameter of the chain-wrapped sprockets is slid over the chain 22. The steel ring 24 holds the chain 22 in the teeth 20 to provide a torque-transmitting coupling which accommodates some shaft misalignment.

To hold the steel ring 24 in position over the sprocket-supported double row chain 22, a coupler shield 28 is positioned over the sprockets 16 and 18 and the chain 22 for securing the steel ring 24 axially over the teeth 20 of the sprockets 16 and 18. The coupler shield 28, when assembled over the steel ring 24, is rotatable with respect to the steel ring and with respect to the first and second sprockets 16 and 18 and can spin freely around the coupling to shield the rotating parts. In addition, the shield 28 keeps harmful dirt and contaminants from the sprockets, chain and steel ring.

Preferably, as best seen in FIG. 1, the coupler shield 28 includes identical shield halves 32 and 34 with integral snaps 36 and snap receiving members 38 at opposite ends of each of the halves. To assemble the shield halves 32 and 34, the integral snaps 36 on one of the halves are aligned with the snap receiving members 38 on the other of the halves. The halves 32 and 34 are then snapped together over the steel ring 24. The assembled shield 28 has a main cylindrical body portion 42 having an inner diameter approximately equal to but slightly larger than the diameter of the steel ring 24. The length of the body portion 42 of the assembled shield 28 is slightly more than the axial length of the steel ring 24 and includes opposite end structures 44 and 46 which extend adjacent the corresponding outer faces of the sprockets 16 and 18, respectively, for axially securing the shield 28 and thus the steel ring 24 in position over the sprockets 16 and 18. Each end structure 44 and 46 includes a semi-circular opening 48 with a flange 49 having a diameter approximately equal to the diameter of the hub on the corresponding sprockets 16 or 18. In the alternate embodiment of FIG. 4, each of the sprocket hubs (17a only is shown) includes an annular channel or groove 50 for receiving the flange 49a of the end structure 44a. The grooves 50 axially locate the shield 28a and provide additional sealing against contaminants while still allowing the shield to freely rotate with respect to the coupling.

The shield 28 is preferably fabricated from a tough plastic such as high density polyethylene. As best seen in FIG. 1, the snaps 36 project in the tangential direction from the body portion 42 of each shield half 32 or 34 and include a step portion 52 preceded by a ramp or cam member 54. The corresponding snap receiving member 38 includes a catch member 58 which engages the cam member 54 to urge the snap 36 inwardly until the step member 52 clears the catch member 58 and springs into locking relationship with the member 58. Protrusions 60 located on the end structure 44 adjacent the snaps 36 engage mating depressions 62 adjacent the members 38 on the opposite end structure 44 to provide increased structural integrity and better sealing. Apertures such as shown at 64 in FIG. 1 may be provided around the shield 28 to prevent moisture build-up within the shield. The joint areas between the shield halves 32 and 34 also allow moisture to escape from the shield.

To assemble the coupler 14, the operator slips the steel ring 24 over one of the shafts 10 or 12 and aligns the sprockets 16 and 18. He then places the double row chain 22 over the teeth 20 of the sprockets 16 and 18 without connecting the end links, and moves the steel ring 24 axially into position over the chain 22. Thereafter the halves 32 and 34 of the coupler shield are moved radially inwardly toward the steel ring 24 with the circular openings 48 positioned around the hubs of the sprockets 16 and 18 (or with the flanges 49a within the grooves 50). The shield halves 32 and 34 are moved toward each other until the integral snaps 36 lock into position in the snap-receiving members 38. Torque is transmitted from the input shaft 10 to the output shaft 12 through the double row chain 22 which permits some axial misalignment of the shafts 10 and 12. The shield 28 generally encompasses the coupling and protects the coupling from the environment while still being free to rotate on the coupler to act as a shield. To unfasten the coupler shield 28, the operator simply depresses the snaps 36 and pulls the shield halves 32 and 34 outwardly from around the steel ring 24. The ring 24 may then be moved axially to free the chain 22 for removal from the sprockets 16 and 18. The shield 28 is relatively light in weight and inexpensive, and facilitates easy assembly and disassembly of the coupler 14.

Having described the preferred embodiment, it will be apparent that modifications can be made without departing from the scope of the invention as defined in the accompanying claims.

I claim:

1. A link chain coupler comprising:
   two toothed sprockets;
   a link chain extending around a substantially portion of the two sprockets;
   a chain retainer ring with an open-ended inner bore axially received over the link chain for maintaining the chain on the sprocket; and
   a retainer cover supported over the chain retainer ring and freely rotatable with respect thereto to act as a shield for the coupler, said retainer cover including a cylindrical body portion having a diameter approximately equal to but slightly larger than the diameter of the retainer ring, said over also including first and second sections radially assemblable over the ring and opposite end structure extending over at least a portion of the respective sprocket and generally closing the cover around the sprockets for maintaining the cover body portion and the chain retainer ring axially aligned with the two sprockets.

2. The invention as set forth in claim 1 wherein the first and second sections are identical half sections.

3. The invention as set forth in claim 2 including matingly engageable locking structure integral with each half section.

4. The invention as set forth in claim 2 wherein the sprockets include hubs and the end structure includes opposite circular openings having diameters approximately equal to the diameter of the corresponding hubs.

5. The invention as set forth in claim 2 wherein the separate sections are fabricated from plastic and generally comprise cylinder halves.

6. The invention as set forth in claim 5 including connecting snaps projecting tangentially from the cylinder halves and corresponding snap-receiving members.

7. A link chain coupler comprising:
   two hubbed tooth sprockets;
   a link chain extending around a portion of the tooth sprockets;
   a metal ring having an inner diameter approximately equal to the diameter of the sprockets with the link chain extending therearound;
   a two-piece retainer cover radially assemblable over and disassemblable from the metal ring and the sprockets;
   wherein said metal ring, when the cover is disassembled, is freely axially movable with respect to the two sprockets between a securing position wherein the ring is located over the chain and a release position wherein the ring is offset axially from the chain; and
   wherein, when the ring is in the securing position, said retainer cover is assemblable over the ring and is freely rotatable with respect to the sprockets, said cover having a body portion for substantially enclosing the metal ring and opposite end structure for securing the metal ring axially in position over the chain and sprockets when the ring is in the securing position.

8. The invention as set forth in claim 7 wherein one of the sprocket hubs includes an annular groove and the end structure projects into the groove.

9. The invention as set forth in claim 7 wherein the retainer cover is rotatably supported over the metal ring for rotation with respect to the ring.

10. The invention as set forth in claim 7 wherein the two-piece retainer cover comprises identical half portions with integral connectors.

11. The invention as set forth in claim 10 wherein the half-portions are fabricated from a plastic material.

* * * * *